3,399,238
PREPARATION OF ARYL THIOLS
Harold Greenfield, Watertown, Conn., assignor to Uniroyal, Inc., a corporation of New Jersey
No Drawing. Filed Sept. 20, 1965, Ser. No. 488,784
6 Claims. (Cl. 260—609)

ABSTRACT OF THE DISCLOSURE

Aryl thiols, and particularly benzenethiol and p-toluenethiol, are prepared by the hydrogenation of a corresponding salt of an aryl sulfinic acid in the presence of a platinum sulfide catalyst.

---

This invention relates to the production of aryl thiols by the catalytic hydrogenation of the salts of aryl sulfinic acids.

Prior art processes for the production of aryl thiols by catalytic hydrogenation, such as Lazier U.S. Patent 2,402,641 and Tanner U.S. Patent 2,402,694, employ base metal sulfides as the hydrogenation catalyst. These catalysts were employed only in the presence of hydrogen sulfide or a precursor of hydrogen sulfide such as sulfur. The presence of hydrogen sulfide necessitates the use of corrosion resistant vessels to withstand the well-known severe corrosion action of hydrogen sulfide.

The present invention employs platinum sulfide as the catalyst and eliminates the necessity of employing hydrogen sulfide or a precursor of hydrogen sulfide. This eliminates the need for expensive corrosion resistant vessels. The use of this catalyst also allows the reaction to occur at reduced pressures.

An object of this invention is to provide an improved process for the manufacture of aryl thiols from the salts of aryl sulfinic acids.

A further object of this invention is to provide a method of manufacturing aryl thiols from the salts of aryl sulfinic acids employing platinum sulfide as the catalyst.

The advantages of employing the platinum sulfide of the present invention as a catalyst over previous prior art processes are: the present process takes place in the absence of added hydrogen sulfide or a precursor of hydrogen sulfide such as sulfur. This eliminates the addition of hydrogen sulfide or sulfur reagent and eliminates the removal of hydrogen sulfide from the reaction products. It also eliminates the need for expensive equipment, particularly corrosion resistant high pressure vessels, to withstand the well-known severe corrosive action of hydrogen sulfide. The use of the present catalyst also enables the present process to take place under milder reaction conditions of temperature, pressure and lower catalyst levels, thus enhancing the economic and commercial attractiveness of the process, and producing aryl thiols of high purity in high yield. The present invention can employ such salts of aryl sulfinic acids as sodium benzenesulfinate (benzenesulfinic acid sodium salt) and sodium p-toluenesulfinate (p-toluenesulfinic acid sodium salt).

The range of reaction conditions useful in the present process are quite variable as the conditions are interdependent. For example, cycle time is a function of temperature, pressure and catalyst level. The optimum reaction conditions are dependent on the economics of the particular plant in which the reaction is run.

The range of pressure useful in the present process varies widely over a range of about 250 p.s.i.g. to about 5000 p.s.i.g. although higher pressure could be used. The most desirable range of pressures being from about 400 p.s.i.g. to about 1500 p.s.i.g.

Reaction temperatures of from 125° to 250° C. may be employed with a range of 150–200° C. preferred. The catalyst levels useful in the present process range from about 0.5 to 20 weight percent based on the sulfinic acid salt with the range of from about 1 to about 10 percent being preferred.

The cycle time useful in the present process is largely dependent on the particular plant involved. A useful range of cycle times for batch operation of the present process is from about 4 to 24 hours.

It should be recognized that while the above conditions relate to a batch type operation, the reaction may also be carried out in continuous systems with either tank or pipe-line type reactors and with slurry or fixed bed catalyst systems in the manner well known in the art.

The following examples not intended to be limiting illustrate the practice of the present invention.

EXAMPLE I

Preparation of benzenethiol from sodium benzenesulfinate. To a 600-ml. stainless steel Magne Dash autoclave was added 90.0 grams (0.434 mole) of sodium benzene-sulfinate dihydrate, 250 ml. of water and 10.0 g. of a 5% platinum sulfide-on-carbon catalyst. The autoclave was sealed, purged first with nitrogen, then with hydrogen, and hydrogen added to a pressure of 800 p.s.i.g. The reaction mixture was heated with agitation at 170–175° C. and 900–1200 p.s.i.g. for 11 hrs., with little or no gas absorption in the last hour. The autoclave was cooled and depressurized and the reaction product was removed. The catalyst was filtered off onto filter-aid and the filter cake washed with 6 N sodium hydroxide solution, water, and then benzene. The combined filtrate was transferred to a separatory funnel and the aqueous and benzene phases separated. The benzene layer was washed with water and the benzene removed in a rotary evaporator under reduced pressure. The residue consisted of 1.2 grams (1.3% yield) of phenyl disulfide, M.P. 52–56.5° C.; there was no depression on a mixed melting point with authentic phenyl disulfide. The aqueous layer was acidified with conc. hydrochloric acid. The oil that came out of solution was dissolved in benzene, the benzene and aqueous phases separated, and the benzene solution washed with water. The benzene solution was dried by codistillation of the water with benzene. A silver nitrate titration of the benzene solution indicated that it contained 46.9 grams (98% yield) of benzenethiol. Distillation of the benzene solution yielded benzene, benzenethiol boiling at 166.5° C., and a small amount of hold-up in the distillation flask.

EXAMPLE II

Preparation of p-toluenethiol from sodium p-toluenesulfinate

A. To a 600-ml. stainless steel Magne Dash autoclave was added 90 grams of sodium p-toluenesulfinate dihydrate (90%+), 250 ml. of water and 5.0 grams of a 5% platinum sulfide-on-carbon catalyst. The autoclave was sealed, purged first with nitrogen, then with hydrogen, and hydrogen added to a pressure of 400 p.s.i.g. The reaction mixture was heated with agitation at 195–200° C. and 400–600 p.s.i.g. for 6½ hrs., with very little gas absorption in the last two hrs. The autoclave was cooled and depressurized and the reaction product removed. The catalyst was filtered off onto filter-aid and the filter cake washed with 6 N sodium hydroxide solution, water and then benzene. The combined filtrate was transferred to a separatory funnel and the aqueous and benzene phases separated. The benzene layer was washed with water and the benzene removed in a rotary evaporator under reduced pressure. The residue consisted of 3.4 grams of p-tolyl disulfide, M.P. 43.5–45° C. There was no depression on a mixed melting point with authentic p-tolyl disulfide. The aqueous layer was acidified with conc. hydrochloric acid. A white solid precipitated and was filtered off. After drying in a vacuum desiccator over Drierite, a solid consisting of 34.4 grams of p-toluenethiol, M.P. 41–42.5° C., was recovered.

B. Example II–A was repeated using 10 grams of the 5% platinum sulfide-on-carbon catalyst and an initial hydrogen pressure of 800 p.s.i.g. The reaction mixture was heated with agitation at 170–175° C. and 900–1200 p.s.i.g. for 6¾ hrs., with little or no gas absorption in the last ¾ hr. The reaction product was treated as in Example II–A and there was isolated 38.3 grams of p-toluenethiol, M.P. 42–43° C. The benzene-soluble, aqueous alkali-insoluble fraction consisted of 0.2 gram of a solid.

C. Example II–B was repeated at 155–160° C. and 900–1200 p.s.i.g. for 19½ hrs. The reaction mixture was treated as in Examples II–A and II–B, and there was isolated 38.3 grams of p-toluenethiol, M.P. 40.5–42° C. The benzene-soluble, aqueous alkali-insoluble fraction consisted of 1.1 grams of an oil.

Having thus described my invention, what I claim and desire to protect by Letters Patent is:

1. A method of making aryl thiols comprising the steps of reacting a salt of an aryl sulfinic acid selected from the group consisting of sodium benzenesulfinate and sodium p-toluenesulfinate with hydrogen in the presence of platinum sulfide catalyst at a temperature of from 125° C. to 250° C. and at a pressure of from 250 to 5000 pounds per square inch and recovering the aryl thiol corresponding to the salt of the aryl sulfinic acid.

2. A method of making benzene thiol comprising the steps of reacting sodium benzenesulfinate with hydrogen in the presence of a platinum sulfide catalyst at a temperature of from 170° C. to 175° C. and at a pressure of 900 to 1200 pounds per square inch and recovering benzenethiol.

3. A method of preparing p-toluene thiol comprising the steps of reacting sodium p-toluenesulfinate with hydrogen in the presence of a platinum sulfide catalyst at a temperature of from 155° C. to 200° C. and at a pressure of from 400 to 1200 pounds per square inch and recovering the p-toluenethiol.

4. A method of preparing aryl thiols which comprises catalytically hydrogenating a salt of an aryl sulfinic acid in the presence of a platinum sulfide catalyst at a temperature of from 125° C. to 250° C. and at a pressure of from 250 to 5000 pounds per square inch and recovering aryl thiol corresponding to the salt of the aryl sulfinic acid.

5. A method of preparing aryl thiols comprising the steps of hydrogenating a salt of an aryl sulfinic acid selected from the group consisting of sodium benzenesulfinate and sodium p-toluenesulfinate in the presence of from 0.5 to 20 weight percent, based on the weight of said salt, of a platinum sulfide catalyst and at a temperature of from 125° C. to 250° C. and at a pressure of from 250 to 5000 pounds per square inch and recovering the aryl thiol corresponding to the salt of the aryl sulfinic acid.

6. The method of claim 5 in which the hydrogenation is carried out at a pressure of from 400 to 1500 pounds per square inch.

References Cited
UNITED STATES PATENTS 2,402,641    6/1946    Lazier et al. _____ 260—609

CHARLES B. PARKER, *Primary Examiner.*

D. R. PHILLIPS, *Assistant Examiner.*